(12) United States Patent
Hijii

(10) Patent No.: US 6,480,579 B2
(45) Date of Patent: *Nov. 12, 2002

(54) METHOD AND APPARATUS FOR RECORDING AND REPLAYING MESSAGES

(75) Inventor: Kazuyoshi Hijii, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,080

(22) Filed: Dec. 16, 1998

(65) Prior Publication Data

US 2002/0067804 A1 Jun. 6, 2002

(30) Foreign Application Priority Data

Dec. 16, 1997 (JP) ................................. 9-364046

(51) Int. Cl.[7] ............................................... H04M 1/64
(52) U.S. Cl. ................ 379/67.1; 379/88.04; 379/88.09; 379/88.19; 379/88.22; 379/88.21; 379/88.23
(58) Field of Search ..................... 379/67.1, 68, 69, 379/70, 76, 83, 85, 88.04, 88.09, 88.19, 88.2, 88.21, 88.22, 88.23, 88.27

(56) References Cited

U.S. PATENT DOCUMENTS 5,283,818 A * 2/1994 Klausner et al. ............ 379/67.1
5,434,908 A * 7/1995 Klein .......................... 379/88
5,559,860 A * 9/1996 Mizikovsky ................ 379/58
5,572,576 A   11/1996 Klausner et al. ......... 379/88.11
5,644,629 A * 7/1997 Chow ......................... 379/142
5,652,789 A * 7/1997 Miner et al. ............... 379/201
5,768,349 A * 6/1998 Knuth et al. ................. 379/88
5,946,386 A * 8/1999 Rogers et al. .............. 379/265
6,018,671 A * 1/2000 Bremer ....................... 455/567
6,021,181 A * 2/2000 Miner et al. ............. 379/88.23
6,061,435 A * 5/2000 Grundvig et al. ........ 379/102.3

FOREIGN PATENT DOCUMENTS

| GB | 2 286 504 A | 6/1995 |
| JP | 3-112246 | 5/1991 |
| JP | 6-169339 | 6/1994 |
| JP | 11-122342 | 4/1999 |
| WO | WO 93/2064 | 10/1993 |

* cited by examiner

*Primary Examiner*—Allan Hoosain
(74) *Attorney, Agent, or Firm*—Scully, Scott, Murphy & Presser

(57) ABSTRACT

An apparatus for recording and replaying a message received from a calling party through a telephone line is disclosed. Messages received from a plurality of calling parties are stored in a memory. The messages stored in the memory are replayed for each of calling parties using caller information. The received messages can be continuously replayed for each of calling parties to allow easy understanding of the messages for the same calling party.

17 Claims, 7 Drawing Sheets

METHOD AND APPARATUS FOR RECORDING AND REPLAYING MESSAGES

BACKGROUND OF THE INVENTION

1. Field of the Invention

The present invention generally relates to a recording and replaying apparatus for use in a telephone system, and in particular to a method and an apparatus which are capable of recording audio messages of a plurality of callers and thereafter replaying the recorded messages.

2. Description of the Related Art

There have been widely used telephones with an automatic answering/recording function. By setting such a telephone to an automatic answering/recording mode, speech messages of callers are recorded in time sequence and thereafter can be replayed in the same order. Such a reproduction scheme, however, has a disadvantage that it is difficult to do immediate access to a desired caller because the sequentially received messages are replayed in the same order. In the case where the same caller made a call several times, these messages may be separately recorded with other messages sandwiched between them, resulting in difficulties in understanding the messages of the same caller.

To directly replay the message of a specific caller, there has been proposed a telephone with automatic answering/recording function in Japanese Patent Application Laid-open No. 3-112246. According to the conventional telephone, the telephone numbers and the names of the callers are displayed on screen and the user selects a desired one therefrom to replay the recorded message. Therefore, instant access to a desired caller's message can be done.

However, in the case where the same caller made a call several times and these messages are separately recorded with other messages sandwiched between them, a user's selection instruction is needed to select each of the messages. Therefore, the conventional telephone also has difficulty in understanding the messages of the same caller.

SUMMARY OF THE INVENTION

An object of the present invention is to provide message recording and replaying method and apparatus, which can easily understand the separately received messages from each caller.

According to the present invention, an apparatus for recording and replaying a message received from a calling party through a telephone line, is provided with a memory for storing a plurality of messages received from a plurality of calling parties and a replay controller for replaying the messages stored in the memory in calling parties using caller information for each of the calling parties. Therefore, the received messages can be continuously replayed for each of calling parties.

The replay controller may count incoming calls or messages for each of the calling parties and replays messages for a calling. party selected from the calling parties in descending order of incoming call count or message count. In other words, highest priority is given to messages of a calling party having the greatest incoming call count or message count and these messages are first replayed.

DETAILED DESCRIPTION OF THE PREFERRED EMBODIMENTS

Hereinafter, an embodiment of the present invention will be described, taking as an example a cordless telephone composed of a telephone base unit and at least one cordless handset unit.

Figure 1:
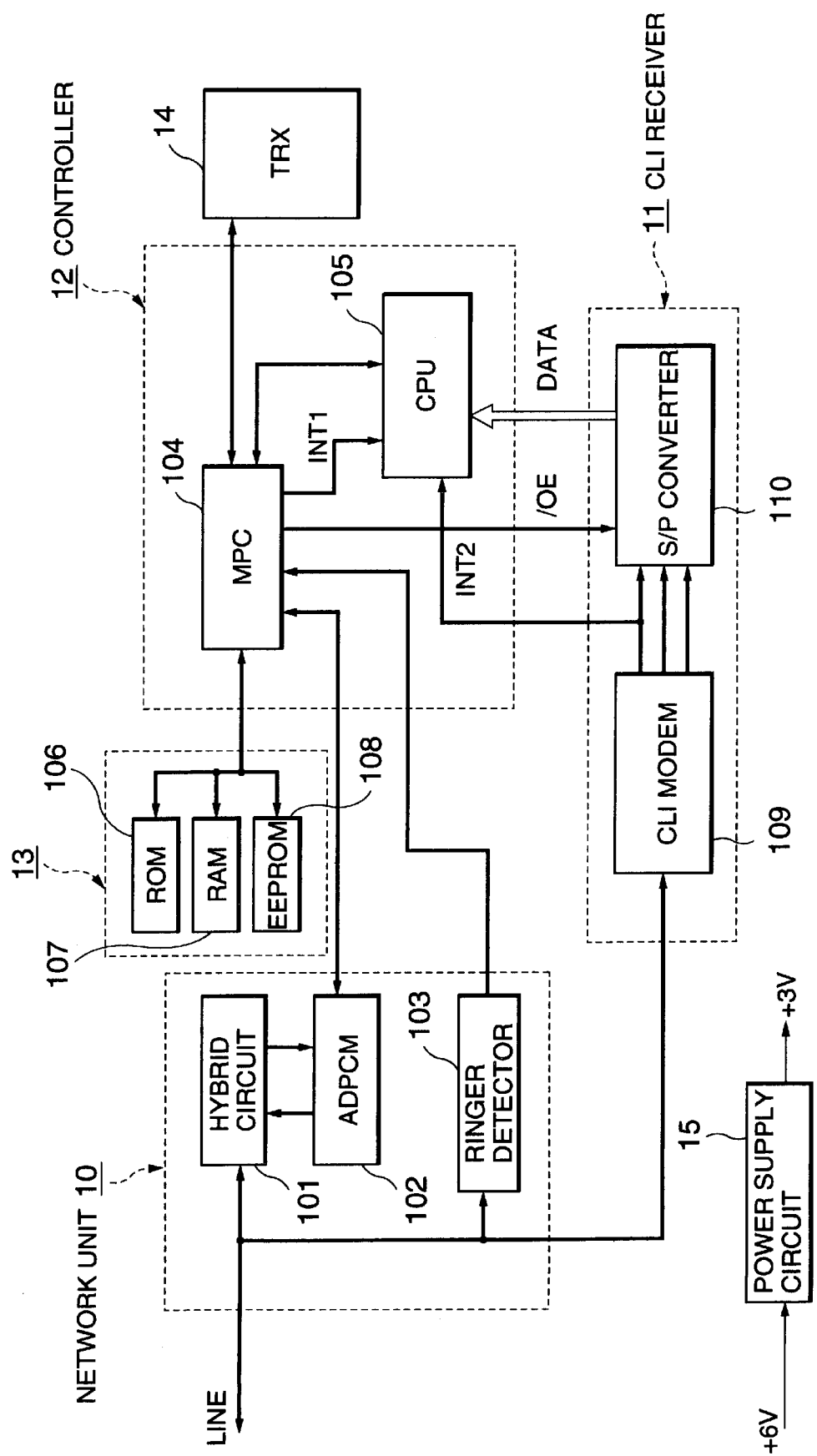
FIG. 1 is a block diagram showing a cordless telephone base unit having an automatic message recording/replaying apparatus according to an embodiment of the present invention.

Referring to FIG. 1. a telephone base unit includes a network unit 10 connected to a telephone line LINE. The network unit 10 is connected to a CLI (caller line indicator) receiver 11 and a controller 12 which is connected to the CLI receiver 11, a memory section 13 and a radio transceiver 14. The controller 12 controls the operations of the cordless telephone system. An audio processing section including a speaker and a microphone for telephone receiver and transmitter is not shown in FIG. 1. The radio transceiver 14 is a used to communicate with a cordless handset unit (not shown) by radio. A power supply circuit 15 supplies necessary power to the circuits of the base unit.

The network unit 10 is composed of a hybrid circuit 101, an ADPCM converter 102 and a ringer detector 103. The ringer detector 103 is connected to the telephone line LINE to detect a ringing signal thereon when an incoming call occurs and outputs a ringer detection signal to the controller 12. The ADPCM converter 102 includes an analog-to-digital converter, a digital-to-analog converter, and ADPCM (adaptive differential pulse code modulation) encoder/decoder, which perform ADPCM encoding/decoding.

The CLI receiver 11 is composed of a CLI modem 109 and a serial-to-parallel (S/P) converter 110. The CLI modem 109 receives caller information including the caller number and the time-of-day data from a telephone switch station. The S/P converter 110 converts the received serial data to parallel data and outputs it to the controller 12. The CLI (caller line indicator) is a function of the telephone switch to send the caller information to a called party.

The controller 12 is composed of a microprocessor peripheral chip (MPC) 104 and a processor (CPU) 105. The MPC 104 is a chip having ports for peripheral circuits therein and has predetermined functions including address decoding, timer, ADPCM control, and sound source control. The ADPCM converter 102 and the ringer detector 103 of the network unit 10 are connected to the MPC 104. The memory section 13 is also connected to the MPC 104. The processor 105 controls the operations of the telephone base unit by running control programs stored in the memory section 13.

The memory section 13 includes a read-only memory (ROM) 106, a random access memory (RAM) 107 and an electrically-erasable programmable ROM (EEPROM) 108.

The ROM 106 stores the control programs including an automatic answering/recording control program and a message management program as will be described later. The RAM 107 is used to store received audio messages and other various data. The EEPROM 108 stores necessary parameters such as an identification number.

Figure 2:
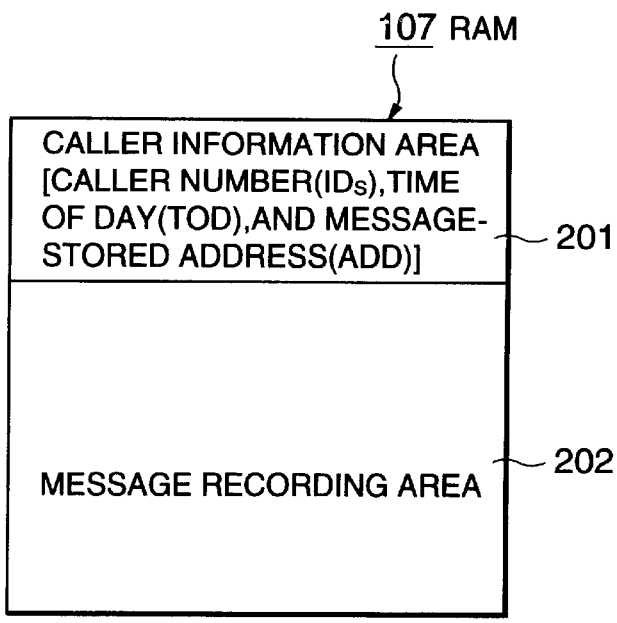
FIG. 2 is a schematic diagram showing memory areas in a RAM for storing caller information and messages in the embodiment.

Referring to FIG. 2, the RAM 107 includes two memory areas: caller information area 201 and message recording area 202. The caller information area 201 is used to store the caller information received from the CLI receiver 11 including caller number (IDs), time-of-day data (TOD), and message-stored address (ADD). The caller number (IDs) is a telephone number of a calling party and the time-of-day data TOD indicates the time and the date of the incoming call. The message-stored address ADD indicates the address of a recorded message in the message recording area 202. The caller information stored in caller information area 201 is structured as will be described later.

The message recording area 202 is used to store ADPCM message data of a caller received from the ADPCM converter 102 of the network unit 10.

Figure 3:
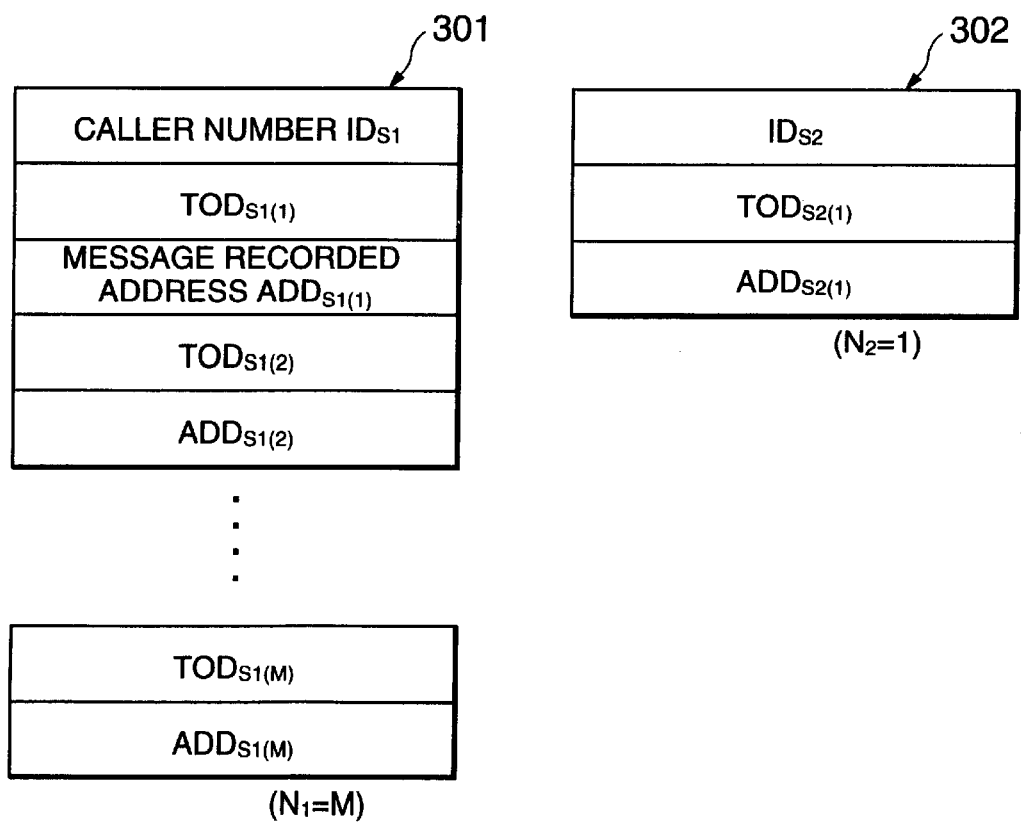
FIG. 3 is a schematic diagram showing an example of caller information stored in the caller information area of FIG. 2.

Referring to FIG. 3, the caller information area 201 stores caller information in time sequence for each caller number. For example, when an incoming call of a caller number $ID_{S1}$ have occurred M times, a caller information group 301 for the caller number $ID_{S1}$ is formed in the caller information area 201. The caller information group 301 includes the caller number $ID_{S1}$ followed by a sequential series of time-of-day data and address data: $TOD_{S1(1)}$ and $ADD_{S1(1)}$, $TOD_{S1(2)}$ and $ADD_{S1(2)}$, . . . , and $TOD_{S1(M)}$ and $ADD_{S1(M)}$.

When a call of a caller number $ID_{S2}$ occurs between incoming calls of the caller number $ID_{S1}$, another caller information group 302 is generated in the caller information area 202 and, each time an incoming calls of the caller number $ID_{S2}$ occurs, the caller information $TOD_{S2(1)}$ and $ADD_{S2(1)}$ is stored in time sequence within the caller information group 302. It is the same with other caller numbers $ID_{S3}$, $ID_{S4}$ . . . .

Since the recorded message can be accessed in the message recording area 202 according to the address ADD of the caller information, it is not necessary to store the recorded messages for each caller number. They may be stored at random in the message recording area 202 regardless of the caller numbers.

Message Recording Operation

Figure 4A:
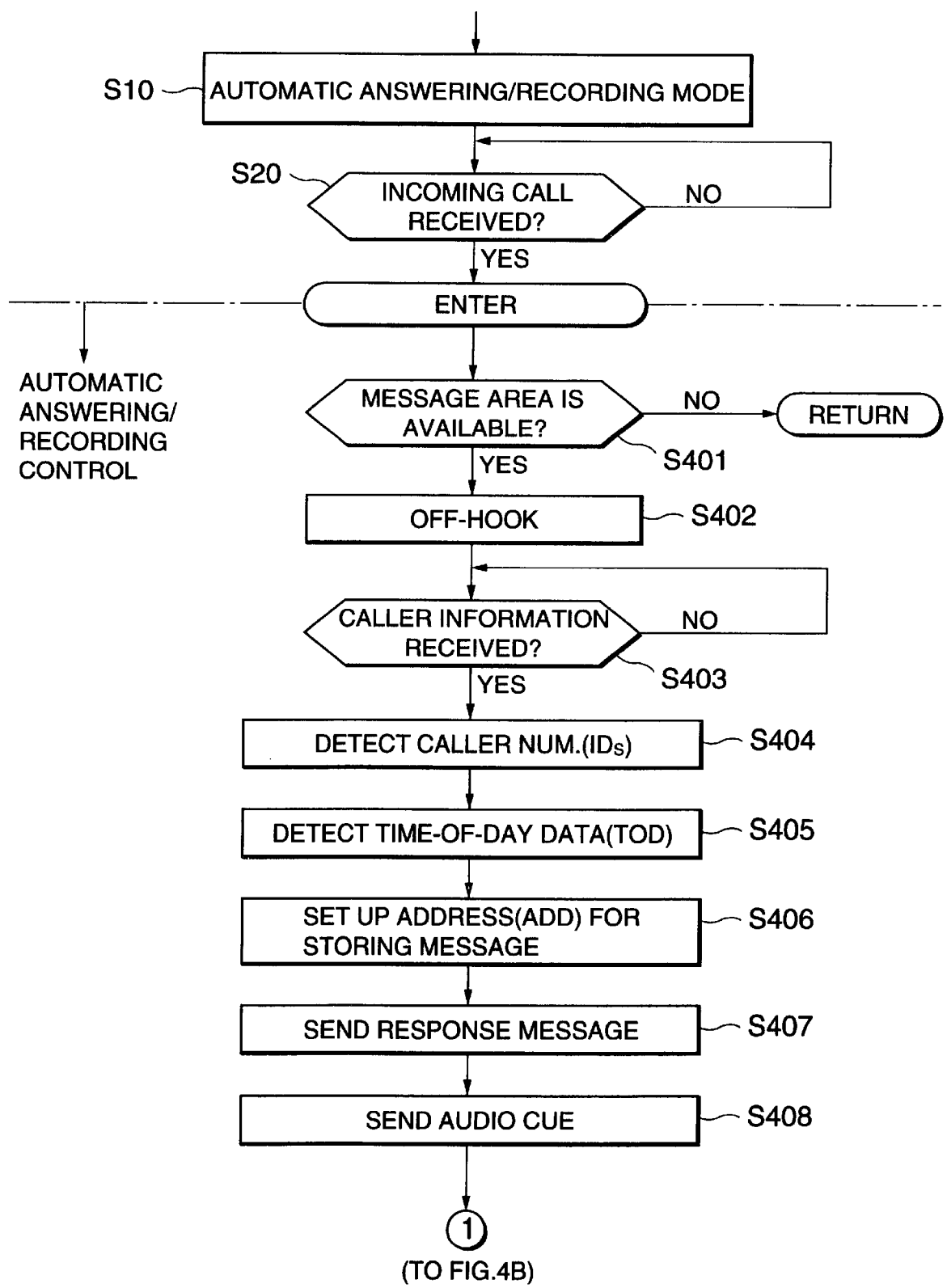
FIGS. 4A and 4B are a flowchart showing an automatic answering/recording operation of the embodiment.
Figure 4B:
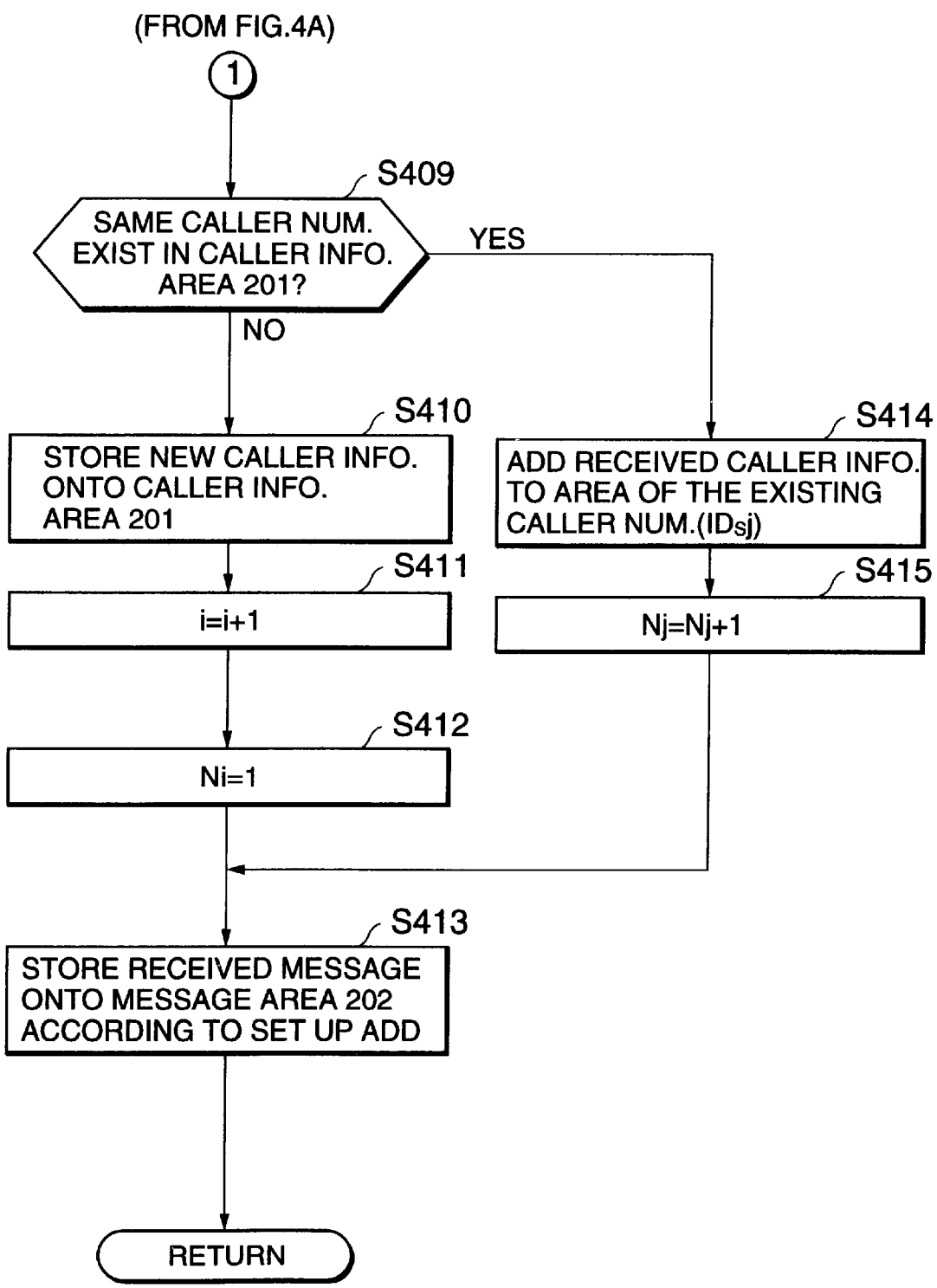

Referring to FIGS. 4A and 4B, after initialization of the RAM 107 and other setting values such as a variable i as described later. It is assumed that the telephone base unit is set to an automatic answering/recording mode (step S10). In this mode, the controller 12 monitors the ringer detection signal received from the ringer detector 103 to determine whether an incoming call occurs (step S20). When the ringer detector 103 detects the ringing signal, the ringer detection signal is output to the MPC 104 of the controller 12. When receiving the ringer detection signal, the MPC 104 outputs an interrupt INT1 to the processor 105. The interrupt INT1 causes the processor 105 to determine that an incoming call occurs (YES in step S20). Then the processor 105 reads the automatic answering/recording control program from the ROM 106 and starts running it.

First, the automatic answering/recording control program running on the processor 105 determines whether the message recording area 202 is available (step S401). If new caller information is allowed to be stored (YES in step S401), then an off-hook operation is made to establish the connection, in other words, an acknowledgment signal is sent back (step 9402). At the same time, an output enable signal /OE is output from the MPC 104 to the S/P converter 110 of the CLI receiver 11 to set the S/P converter 110 for a state that parallel data, that is, caller information, can be output to the processor 105.

On the other hand, when receiving caller information from the telephone line LINE, the CLI modem 109 outputs an interrupt INT2 to the processor 105. The interrupt INT2 causes the processor 105 to start the message recording control as described hereinafter.

The processor 105 waits for caller information to be received from the CLI receiver 11 (step S403). When receiving caller information from the CLI receiver 11 (YES in step S403), the processor 105 detects a caller number IDs (step S404) and further the time-of-day data TOD of the incoming call (step S405). Thereafter, the processor 105 sets up an address ADD for storing an audio message in the message recording area 202 of the RAM 107 (step S406). Subsequently, the processor 105 controls the network unit 10 to send a response message to the telephone line LINE (step S407) and then to send an audio cue signal to the calling party (step S408). After receiving the audio cue signal, the calling party will send a voice message to the called party.

When detecting the caller number IDs (step S404), the processor 105 searches the caller information area 201 for the detected caller number IDs to determine whether the detected caller number IDs exists in the caller information area 201 (step S409). If not found (NO in step S409), the processor 105 stores the caller information as a new caller onto the caller information area 201 (step S410). Thereafter, the processor 105 increments the variable i (the initial value is zero) by one (step S411) and the number $N_i$ of incoming calls is set to 1 (step S412). Therefore, each time a new caller number is detected, the variable i is incremented by one. Then, the processor 105 stores the ADPCM message data received from the caller through the network unit 10 onto the message recording area 202 according to the set-up address ADD (step S413).

On the other hand, if the detected caller number IDs is identical to the caller number $ID_{Sj}$ previously stored in the caller information area 201 (YES in step S409), then the processor 105 adds the received caller information to the area of the existing caller number $ID_{Sj}$ (step S414). Thereafter, the number $N_j$ of incoming calls corresponding to the caller number $ID_{Sj}$ is incremented by one (step S415). Therefore, each time a message is received from the caller corresponding to the caller number $ID_{Sj}$, the number $N_j$ of incoming calls is incremented by one. Thereafter, the processor 105 stores the ADPCM message data received from the caller through the network unit 10 onto the message recording area 202 according to the set-up address ADD (step S413).

Message Relapying Operation

Figure 5:
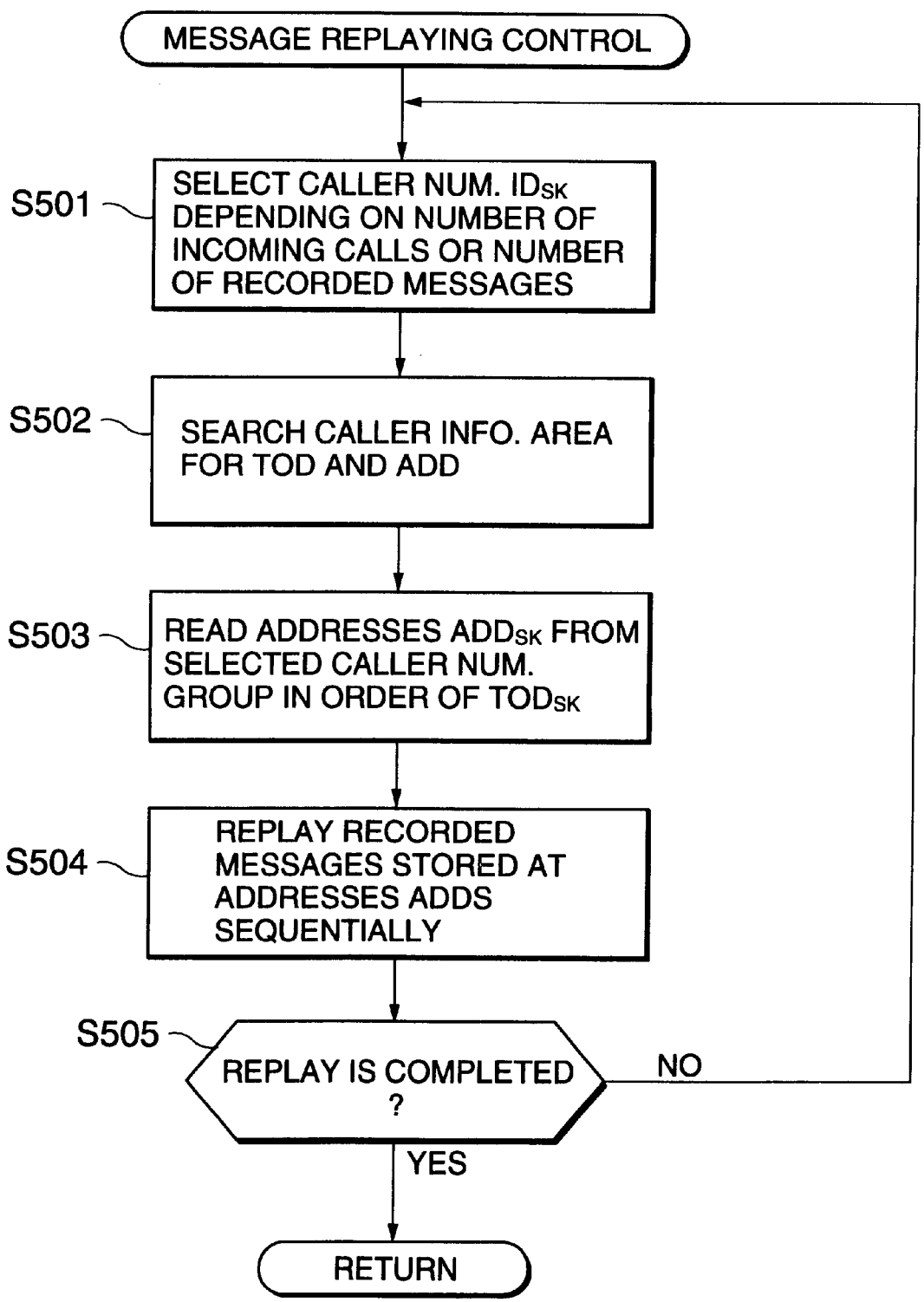
FIG. 5 is a flowchart showing a message replaying operation of the embodiment.

Referring to FIG. 5, when a message replay is selected, the processor 105 starts running the message replaying control program. First, a caller number of a message to be replayed is selected depending on the number of incoming calls (step S501). In this embodiment, priority is given to a caller number having the greatest number of incoming calls. Alternatively, priority may be given to a caller number having the greatest number of recorded messages. Further, it is possible to automatically select the caller numbers in descending order of the number of incoming calls.

After a caller number $ID_{SK}$ has been selected as described above, the processor 105 searches the caller information area

201 for time-of-day data $TOD_{SK}$ and address $ADD_{SK}$ (step S502). Thereafter, the processor 105 sequentially reads an address $ADD_{SK}$ from the group of the selected caller number $ID_{SK}$ in order of the time-of-day data $TOD_{SK}$ (step S503). When reading one address $ADD_{SK}$, the processor 105 replays the message recorded at that address $ADD_{SK}$. In this manner, all the recorded messages in the group of the selected caller number $ID_{SK}$ are replayed in order of $TOD_{SK}$ (step S504). If the user wants to select the subsequent caller number having the second highest priority (NO in step S505), then control returns to the step S501. If the relay is ended (YES in step S505), control returns to the main routine.

As described above, the user can hear at the start a group of messages received from a caller who made the most frequent calls. Further, in the case where a plurality of messages have been received from a plurality of callers, the messages can be replayed for each caller according to the caller number groups stored in the caller information area 201 as shown in FIG. 3. Therefore, it is easy to understand the import of the messages from the same caller.

According to the above embodiment, the caller information is stored onto the caller information area 201 in a caller-by-caller basis as shown in FIG. 3. However, the following method may be employed with the same advantages.

When receiving a message from a caller, the caller information is stored in time sequence onto the caller information area 201 of the RAM 107. Thereafter, when a replay is done, the processor 105 performs the sorting of the caller information in the caller information area 201 using the caller number IDs as a primary key and the time-of-day data TOD as a secondary key. According to the result, the processor 105 replays the messages for each caller number. Further, by counting the messages for each caller number, as described before, the user can hear at the start a group of messages received from a caller who made the most frequent calls.

EXAMPLE

Figure 6:
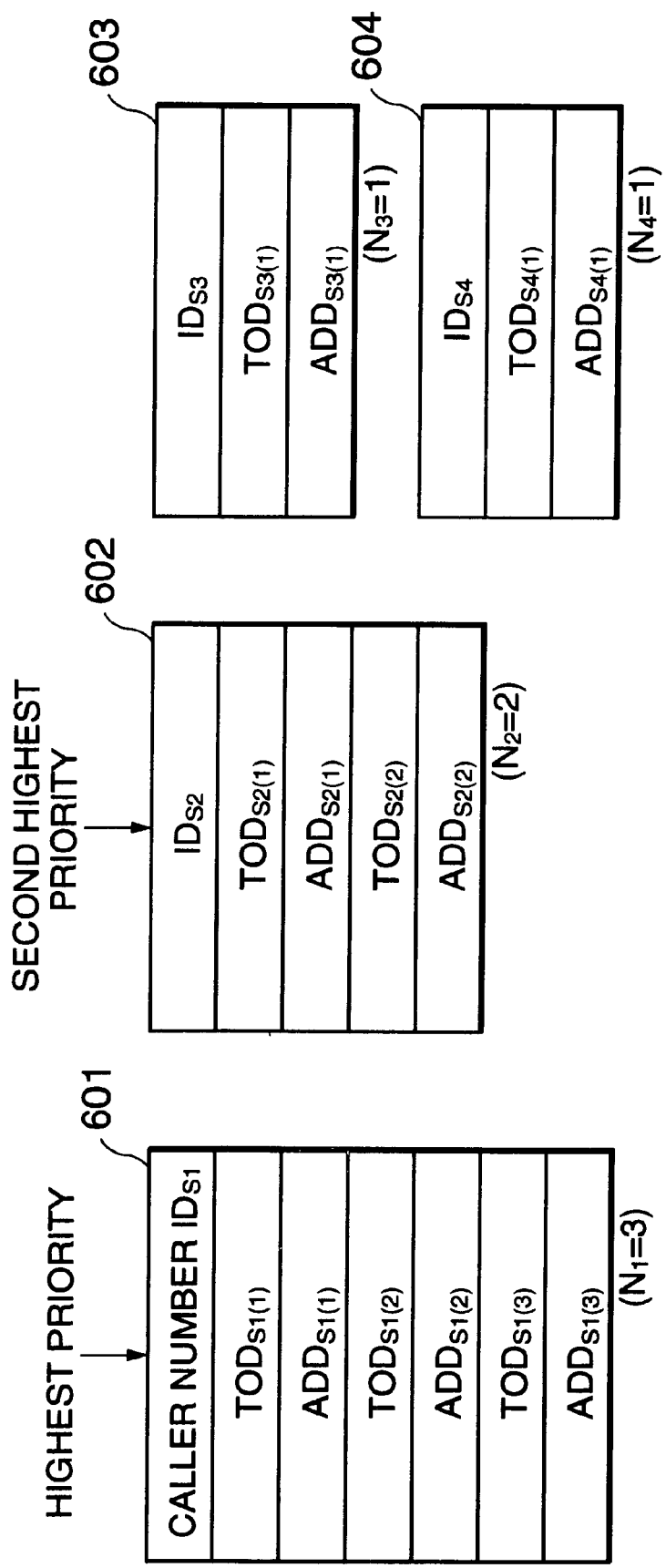
FIG. 6 is a schematic diagram showing an example of caller information management for explanation of the message replaying operation of FIG. 5.

Referring to FIG. 6, in the case where three messages have been received for a caller number $TD_{S1}$, two messages for a caller number $ID_{S2}$, and one message for each of caller numbers $ID_{S3}$ and $ID_{S4}$, the received caller information pieces are divided into four groups 601–604 corresponding to the caller numbers $ID_{S1}$–$ID_{S4}$, respectively. The group 601 of the caller number $ID_{S1}$ includes the first caller information consisting of $TOD_{S1(1)}$ and $ADD_{S1(1)}$, the second caller information consisting of $TOD_{S1(2)}$ and $ADD_{S1(2)}$, and the third caller information consisting of $TOD_{S1(3)}$ and $ADD_{S1(3)}$, in the order presented. The total number $N_1$ of messages is 3. The group 602 of the caller number $ID_{S2}$ includes the first caller information consisting of $TOD_{S2(1)}$ and $ADD_{S2(1)}$ and the second caller information consisting of $TOD_{S2(2)}$ and $ADD_{S2(2)}$ in the order presented. The total number $N_2$ of messages is 2. The group 603 of the caller number $ID_{S3}$ includes the first caller information consisting of $TOD_{S3(1)}$ and $ADD_{S3(1)}$. The total number $N_3$ of messages is 1. The group 604 of the caller number $ID_{S4}$ includes the first caller information consisting of $TOD_{S4(1)}$ and $ADD_{S4(1)}$. The total number $N_4$ of messages is 1.

In this case, the greatest number of messages is $N_1=3$ for the caller number $ID_{S1}$. Therefore, highest priority is given to the group 601 of the caller number $ID_{S1}$ and the message stored at the address $ADD_{S1(1)}$ is replayed at the start. Subsequently, the messages stored at the addresses $ADD_{S1(2)}$ and $ADD_{S1(3)}$ are successively replayed. Thereafter, the group 602 of the caller number $ID_{S2}$ having the second highest priority and then the groups 603 and 604 can be replayed similarly depending on the user's instructions.

Needless to say, the user can select the caller number to be replayed at the start. If the group 602 of the caller number $ID_{S2}$ having the second highest priority is selected, the message stored at the address $ADD_{S2(1)}$ is replayed at the start. Subsequently, the message stored at the address $ADD_{S2(2)}$ is replayed.

Conventional Example for Comparison

Figure 7:
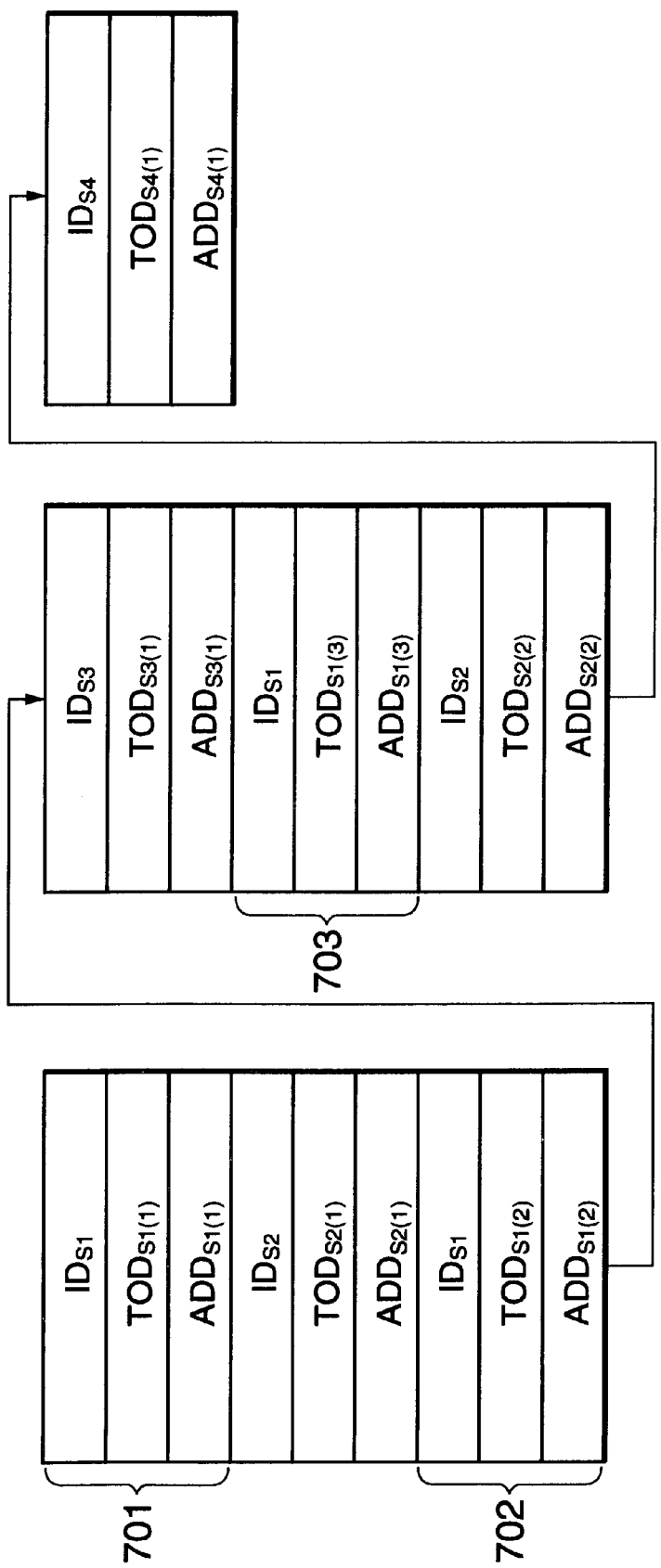
FIG. 7 is a schematic diagram showing conventional caller information management.

As shown in FIG. 7, a replay according to the prior art is performed in a time sequence basis. More specifically, in the case where three messages have been received for a caller number $ID_{S1}$, two messages for a caller number $ID_{S2}$, and one message for each of caller numbers $ID_{S3}$ and $ID_{S4}$ in random intervals, these pieces of received caller information are stored in order of time-of-day data TOD. The messages are replayed in the same time sequence.

In the case where a desired caller number is selected by the user pressing a key, the messages corresponding to the caller information pieces 701, 702 and 703 are selectively replayed. However, the caller information pieces 701, 702 and 703 for the same caller cannot be consecutively replayed. It is necessary to select each caller number.

In the above embodiment, the present invention is applied to a cordless telephone base unit. However, the present invention is not limited to the embodiment. The present invention may be applied to any type of automatic telephone recording/replaying machine and a telephone such as a cellular mobile telephone with that function. Further, the present invention can be applied to a telephone switch system provided with message recording equipment which can be accessed by a terminal and transmit messages to the terminal.

According to the present invention, in the case where a plurality of messages have been received from a plurality of callers, the messages can be replayed for each caller. Therefore, it is easy to understand the import of the messages from the same caller. Further, by counting the incoming calls or the recorded messages for each caller, the user can hear at the start a group of messages received from a caller who made the most frequent calls.

What is claimed is:

1. An apparatus for recording and replaying a message received from a calling party through a telephone line, comprising:

a memory for storing a plurality of messages received from a plurality of calling parties; and a replay controller for replaying the messages stored in the memory using caller information for each of the calling parties, said caller information comprising caller number and at least one of (a) time-of-day data, and (b) message-stored address, wherein the replay controller groups the messages for each of the calling parties and then replays a group of messages based on selection from the caller information, for a selected one of the calling parties.

2. The apparatus according to claim 1, wherein the replay controller replays messages included in the group in time sequence.

3. The apparatus according to claim 1, wherein the replay controller comprises:

a counter for counting incoming calls for each of the calling parties to produce an incoming call count; and a controller for replaying messages for a calling party selected from the calling parties in descending order of the incoming call count.

4. The according to claim 1, wherein the replay controller comprises:

a counter for counting messages for each of the calling parties to produce a message count; and a controller for first replaying messages for a calling party selected from the calling parties in descending order of the message count.

5. The apparatus according to claim 1, wherein the replay controller first replays messages for a desired calling party selected by a selection instruction.

6. An apparatus for recording and replaying a message received from a calling party through a telephone line, comprising:

a first memory for storing a plurality of messages received from a plurality of calling parties;

a second memory for storing a plurality of caller information pieces each including a caller number and an address of the first memory storing a message corresponding to the caller number;

a manager for managing the messages to be replayed using the caller information pieces stored in the second memory such that the caller information pieces are divided into a plurality of groups each corresponding to a different calling party;

a replay controller for replaying messages corresponding to a selected group of caller information pieces, wherein the manager comprises:

a counter for counting incoming calls for each of the groups to produce an incoming call count; and a processor for dividing the caller information pieces into a plurality of groups each corresponding to a different calling party and giving highest selection priority to a group having the greatest incoming call count.

7. The apparatus according to claim 6, wherein the manager further comprises:

a counter for counting messages for each of the calling parties to produce a message count; and a processor for dividing the caller information pieces into a plurality of groups each corresponding to a different calling party and giving highest selection priority to a group having the greatest message count.

8. The apparatus according to claim 6, wherein the manager first selects a calling party depending on a selection instruction received from outside.

9. A method for recording and replaying a message received from a calling party through a telephone line, comprising the steps of:

a) storing a plurality of messages received from a plurality of calling parties as caller information comprising caller number and at least one of (i) time-of-day data and (ii) message-stored address; and b) replaying the messages stored based on selection from said caller information for each of the calling parties.

10. The method according to claim 9, wherein the step b) comprises the steps of:

grouping the messages for each of the calling parties; and replaying a group of messages for a selected one of the calling parties.

11. The method according to claim 10, wherein messages included in the group are replayed in time sequence.

12. The method according to claim 9, wherein the step b) comprises the steps of:

counting incoming calls for each of the calling parties to produce an incoming call count; and replaying messages for a calling party selected from the calling parties in descending order of the incoming call count.

13. The method according to claim 9, wherein the step b) comprises the steps of:

counting messages for each of the calling parties to produce a message count; and replaying messages for a calling party selected from the calling parties in descending order of the message count.

14. The method according to claim 9, wherein the step b) comprises the steps of:

replaying messages for a desired calling party selected by a selection instruction.

15. A cordless telephone base apparatus comprising an automatic answering and recording device for recording and replaying a message received from a calling party through a telephone line, the automatic answering and recording device comprising:

a memory for storing a plurality of messages received from a plurality of calling parties; and a replay controller for replaying the messages stored in the memory using caller information for each of the calling parties, said caller information based on selection from caller number and at least one of (a) time-of-day data and (b) message-stored address.

16. A portable telephone apparatus comprising an automatic answering and recording device for recording and replaying a message received from a calling party through a telephone line, the automatic answering and recording device comprising:

a memory for storing a plurality of messages received from a plurality of calling parties; and a replay controller for replaying the messages stored in the memory using caller information for each of the calling parties, said caller information based on selection from caller number and at least one of (a) time-of-day data and (b) message-stored address.

17. A telephone switch system comprising an automatic answering and recording device for recording and replaying a message received from a calling party depending on an automatic answering setting instruction received from a called party, the automatic answering and recording device comprising:

a memory for storing a plurality of messages received from a plurality of calling parties; and a replay controller for replaying the messages stored in the memory using caller information for each of the calling parties, said caller information based on selection from caller number and at least one of (a) time-of-day data and (b) message-stored address.

* * * * *